A. W. ABEL.
APPARATUS FOR MEASURING LIQUIDS.
APPLICATION FILED DEC. 24, 1915.
1,326,705.
Patented Dec. 30, 1919.
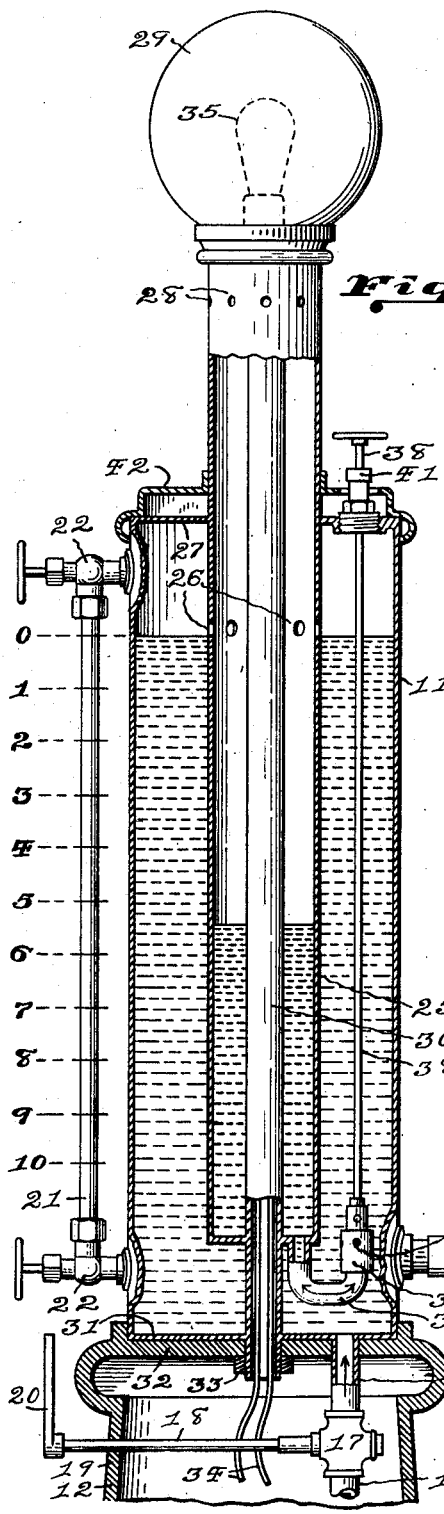
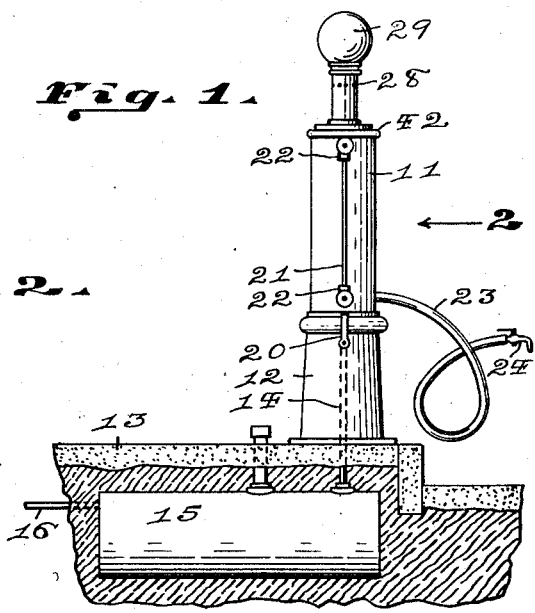
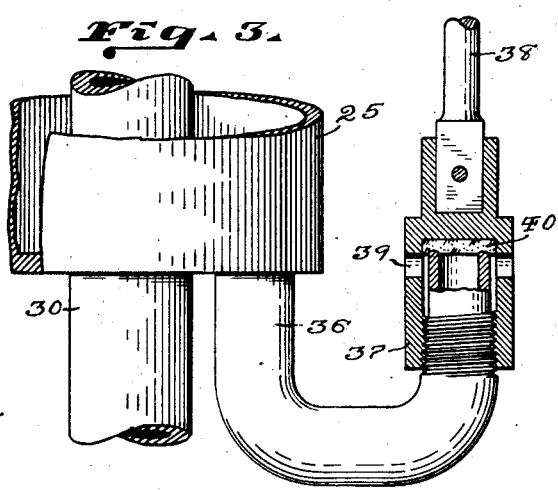
INVENTOR:
Arthur W. Abel.
BY
Frank P. Shepard.
ATTORNEY.

UNITED STATES PATENT OFFICE.

ARTHUR W. ABEL, OF OKLAHOMA, OKLAHOMA.

APPARATUS FOR MEASURING LIQUIDS.

1,326,705.      Specification of Letters Patent.      Patented Dec. 30, 1919.

Application filed December 24, 1918. Serial No. 268,169.

*To all whom it may concern:*

Be it known that I, ARTHUR W. ABEL, a citizen of the United States, residing at Oklahoma, in the county of Oklahoma and State of Oklahoma, have invented certain new and useful Improvements in Apparatus for Measuring Liquids, of which the following is a specification, reference being had to the accompanying drawings.

The invention pertains to apparatus for measuring gasolene and other liquids.

An object of the invention is to provide apparatus which will measure accurately; which can be cheaply constructed; which may be easily operated; and which will handle inflammable liquids safely.

Other objects and advantages of the invention will be set forth in the ensuing description.

The drawings show one of the practical forms in which the invention may be embodied.

Figure 1 is an elevation view of the apparatus installed for use, showing also a sectional view of a street and sidewalk.

Fig. 2 is a fragmental sectional view on larger scale and in the direction of the arrow 2 of Fig. 1.

Fig. 3 shows parts which are shown in Fig. 2, but on still larger scale and with a certain closure in section.

Like characters of reference designate like parts in all the figures.

In carrying out the objects stated, the invention includes a vertically-elongated liquid container 11, which may be supported on a stand 12 and at such height that the liquid may be drawn from it by gravity into an automobile or other receptacle.

The stand 12 may be set on any suitable foundation, such, for example, as a sidewalk 13.

The container 11 may be supplied from any suitable source of liquid, for example through a pipe 14 from a tank 15 which is buried under the side-walk 13, a little compressed air being forced into the tank pressed air being forced into the tank through a pipe 16 to force the liquid upward.

The pipe 14 should be provided with a substantial valve 17 for throttling the supply of gasolene to the container 11, the stem 18 of this valve extending out through a wall 19 of the stand 12 and having a convenient hand-hold 20.

A tubular glass gage 21 is provided for the container 11, the upper and lower ends of this gage being placed in communication with the interior of the container by the well known gage connections 22.

The gage 21 may be graduated in any suitable manner to indicate the removal of successive predetermined amounts, for example gallons, from the container 11.

A flexible hose connection 23 may lead from the lower end of the container 11 to the desired point of delivery, and the outer end of this hose connection is provided with the usual valve 24.

In using the apparatus described, the valve 17 is first opened to allow the container 11 to fill with gasolene from the tank 15, the valve being carefully controlled at the end of the filling period to bring the level of the gasolene exactly to the zero (0) graduation.

The gage 21 will then accurately indicate the amount of gasolene drawn off through the hose connection 23.

In order that the surface level of the gasolene in the container 11 may be brought to accurately coincide with the zero graduation of the gage 21 in filling said container, the inventor has provided improved means for automatically limiting the depth of the gasolene at said graduation.

In providing this means, an overflow container 25 is employed and placed in permanent communication with the container 11, the communicating port or ports between the two containers being at such height as to bring the surface level of the gasolene in the container 11 to the zero point of the gage 21.

The overflow container 25 may be located at any suitable place with respect to the container 11; but in the present instance it is placed inside the container 11 and provided with inlet overflow ports 26 whose lower edges are exactly on a level with the zero graduation of the gage 21.

In supporting the container 25 it may be an integral depending portion of the upper wall 27 of the container 11, and it is extended well above said wall 27 as a ventilating flue and is provided with ventilating ports 28 to relieve gas pressure that may be set up in either container.

The usual lamp globe 29 may be supported on top of the overflow container 25.

To prevent lateral vibration of the upper and lower ends of the container 25 from exerting excessive strain on the upper wall 27 of the container 11, a rod 30 may be extended vertically through said container 25 and through the lower wall 31 of the container 11; said rod extending on down through the upper wall 32 of the stand 12 and having a screwthreaded nut 33 to hold the container 11 in place on the stand.

The rod 30 may be hollow and be utilized as a conduit for electric wiring 34 leading to a lamp 35 in the globe 28.

When the surface level of the gasolene in the container 11 has been lowered to the bottom of said container or to, say, the 10th graduation of the gage 21, the gasolene that has overflowed into the container 25 through the ports 26 may be emptied into the container 11 before again beginning to fill the latter from the tank 15.

A valve for this purpose is provided by arranging an outlet tube 36 in the bottom of the container 25 and closing said tube by a screw cap 37; said tube being extended outward and directed upward as best shown in Fig. 3 so that said cap may be operated by a rod 38 which enters through the upper wall 27 of the container 11.

The screw cap 37 is provided with side openings 39 so that the gasolene may pass without completely unscrewing said cap, and the cap may be provided with a suitable gasket 40.

Where the valve rod 38 passes through the wall 27 a stuffing-box 41 may be used to prevent escape of gas, but since the gas is never above atmospheric pressure the stuffing-box need not be set tightly.

An ornamentation cap 42 may embrace the upwardly-extended container 25 and rest on the top of the container 11.

In making up the containers 11 and 25 it is preferable that said parts and the central rod 30 be torch-welded together into one piece, which can be easily done and will prevent any leakage of gasolene.

The following is claimed:—

1. In apparatus of the class described, a liquid container, valve-controlled means for filling the container, a gage for indicating the depth of the liquid in the container, a second container arranged within the first-named container and having at its upper end an inlet overflow port, the second or inner container having at its lower end a valve-controlled outlet opening for allowing its contents to be emptied back into the first-named container.

2. In apparatus of the class described, a liquid container including a top wall, a second container arranged within the first-named container and depending from said wall, the second container having an inlet overflow port leading from an upper portion of the first-named container and being vented to the atmosphere above said wall.

3. In apparatus of the class described, a liquid container including a top wall, a second container arranged within the first-named container and depending from said wall, said second container also extending through and above said top wall and vented to the atmosphere, the second container having an inlet overflow port leading from an upper portion of the first-named container.

4. In apparatus of the class described, a liquid container including a top wall, a second container arranged within the first-named container and extending upward through said wall, the second container having an inlet overflow port leading from an upper part of the first-named container and having its end above said wall vented to the atmosphere, a rod extending vertically through the second or inner container and having its lower end anchored to the bottom of the first-named container, and means for indicating the depth of liquid in the first-named container.

5. In apparatus of the class described, a liquid container including a top wall, a second container arranged within the first-named container and extending upward through said wall, the second container having an inlet overflow port leading from an upper part of the first-named container and having its upper end above said wall vented to the atmosphere, a valve-controlled passage between the lower ends of the two containers, a source of liquid supply under pressure, a valve-controlled passage leading from said source to the first-named container, and a gage for indicating the depth of the liquid in said first-named container.

Witness my hand this 16 day of December, 1918.

ARTHUR W. ABEL.